United States Patent [19]

Vasquez

[11] Patent Number: 4,531,434
[45] Date of Patent: Jul. 30, 1985

[54] VIBRATION ATTENUATOR FOR DISC BRAKE ROTOR MACHINING

[76] Inventor: Andrew R. Vasquez, 4011 E. First St. #1, Long Beach, Calif. 90803

[21] Appl. No.: 596,151

[22] Filed: Apr. 2, 1984

Related U.S. Application Data

[63] Continuation-in-part of Ser. No. 467,467, May 16, 1983, abandoned.

[51] Int. Cl.³ .............................................. B23B 5/02
[52] U.S. Cl. .................................... 82/34 R; 82/4 A; 74/574; 188/73.38; 188/380
[58] Field of Search ............... 82/34 R, 4 A, 38 A, 82/35, 38 R, 2 A, DIG. 9; 188/73.36, 73.37, 73.38, 378–380; 294/99.2; 74/574

[56] References Cited

U.S. PATENT DOCUMENTS

| | | | |
|---|---|---|---|
| 2,563,422 | 8/1951 | Sabo | 294/99.2 |
| 3,677,112 | 7/1972 | Keniston | 294/99.2 |
| 3,691,878 | 9/1972 | Mitchell | 82/38 A |
| 3,710,661 | 1/1973 | Mitchell | 82/38 A |
| 4,178,819 | 12/1979 | Mahon | 82/38 A |
| 4,266,454 | 5/1981 | Mitchell et al. | 82/4 A |

Primary Examiner—Leonidas Vlachos
Assistant Examiner—Jerry Kearns
Attorney, Agent, or Firm—Fulwider, Patton, Rieber, Lee & Utecht

[57] ABSTRACT

A vibration attenuator for use in the machining of irregularly worn disc brake rotors. A pair of pads are arranged to rest upon lathe cutter bits acting against the opposite faces of the rotor. The pads are biased inwardly so that the rotation of the rotor forcibly urges the pads against the cutter bits and against the adjacent rotor surfaces for damping vibrations of these structures. Pins on the pads engage the cutter bits so that the pads move with the cutter bits as the machining operation proceeds, thereby maintaining damping engagement throughout the operation.

4 Claims, 10 Drawing Figures

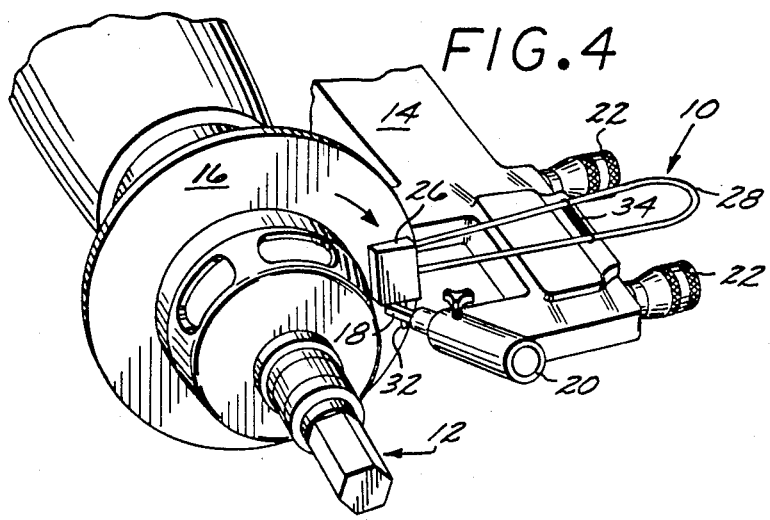
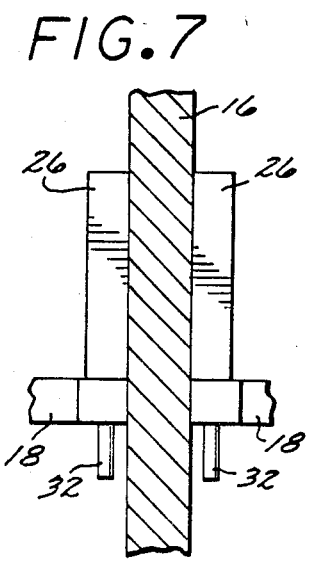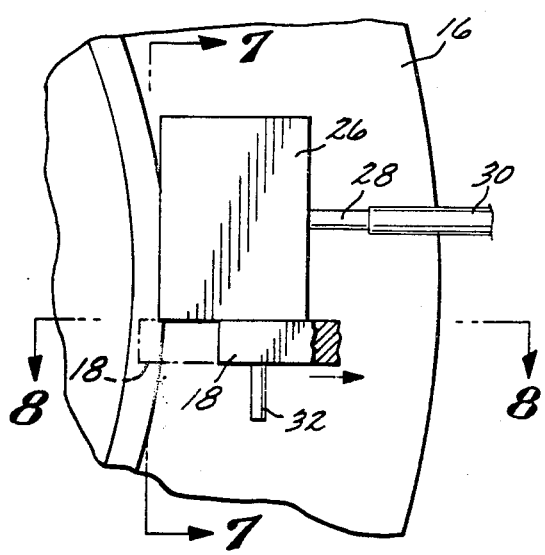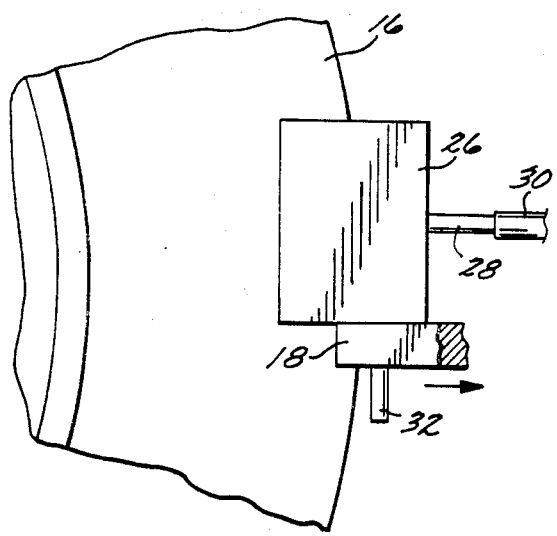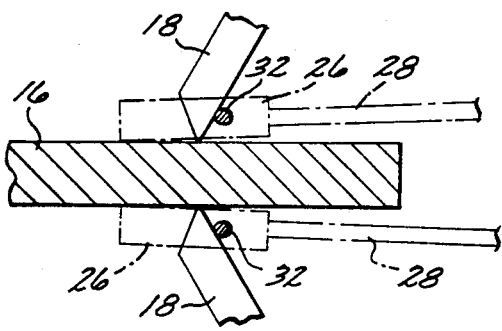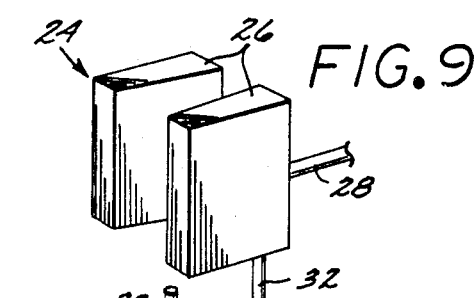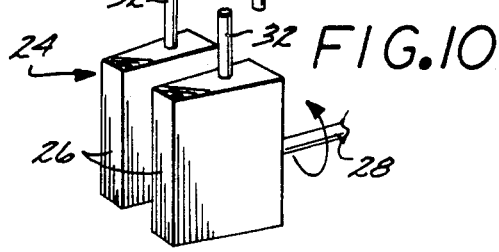

VIBRATION ATTENUATOR FOR DISC BRAKE ROTOR MACHINING

CROSS REFERENCE TO RELATED APPLICATION

This is a continuation-in-part of applicant's co-pending patent application Ser. No. 467,467 filed May 16, 1983 and now abandoned. The benefit of the filing date of such prior application is claimed for the subject matter common to the present application.

BACKGROUND OF THE INVENTION

1. Field of the Invention

The present invention relates to a vibration attenuator for attenuating the vibration caused during machining or resurfacing of a disc brake rotor by a pair of cutter bits.

2. Description of the Prior Art

After a period of use the faces of disc brake rotors of automobiles, trucks and the like become worn unevenly. A characteristic pattern of circumferentially arranged ridges and valleys develops which interferes with optimum braking action. These must be removed by resurfacing or machining. Typically this is done by mounting the rotor on an arbor assembly for rotation by a brake rotor lathe. A pair of cutter bits are moved by the lathe carriage across the faces of the rotating rotor to cut enough of the material away to render the faces flat or planar. During this operation the cutter bits and rotor typically produce loud, screeching noises which are not only unpleasant for the lathe operator and others in the vicinity, but there are accompanying vibrations of the rotor and bits which adversely affect the accuracy of the machining.

Various means have been advanced to attenuate or eliminate such vibrations. One system employs damping pads designed to bear against the opposite faces of the rotor in a position out of the way of the cutter bits. The pads are carried by a relatively complex mounting structure which is secured to the brake lathe. Precise adjustment of the position of the pads is required, and an elaborate linkage arrangement is provided to accomplish this. The arrangement is relatively complex and costly, requires subtle adjustments, and is only partially affective in damping the machining noises.

Another system of the prior art utilizes a resilient band adapted to be stretched and placed upon the circumference of the rotor. One must purchase a set of such bands to accommodate the various sizes of rotor to be machined. The system is unsatisfactory for that reason, and also because the vibration attenuation is not always adequate.

Yet another arrangement of the prior art employs a U-shape rod or handle which mounts a pair of friction resistant pads at its extremities. The pads are placed in position to bear against the opposite faces of the rotor thereby to damp rotor vibrations. However, the pads are not effective to attenuate cutter bit vibrations.

SUMMARY OF THE INVENTION

According to the present invention, a vibration attenuator is provided which comprises a pad assembly including a pair of pads adapted to rest in frictional engagement against the opposite faces of a disc brake rotor. The pads are operative to rest upon the cutter bits, and bias means urge the pads against the rotor faces whereby rotation of the rotor in a brake lathe forcibly urges the pads against the lathe cutter bits. The consequent close association of the pads with the cutter bits attenuates their vibration, as well as that of the rotor. The pads each carry an element which projects into engagement with the cutter bits. On movement of the cutter bits in a cutting direction, these pad elements are carried by the bits, in turn causing movement of the pads in common with the cutter bits. The pads are thus constantly forcibly urged in damping relation against the cutter bits, this close, damping relation being maintained as the cutter bits move across the faces of the rotor during the cutting or resurfacing operation.

In a preferred embodiment of the vibration attenuator, the pads are pivotable through 180 degrees in order to present fresh wearing surfaces once the original wearing surfaces have been worn down.

Other objects and features of the invention will become apparent from consideration of the following description taken in connection with the accompanying drawings.

BRIEF DESCRIPTION OF THE DRAWINGS

FIG. 4 is a partial perspective view of the arbor assembly and cutter mounting carriage of a typical brake rotor lathe;

FIG. 5 is a side elevational view of the attenuator of FIG. 4 engaged upon the adjacent face of a disc brake rotor;

FIG. 6 is a view similar to FIG. 5, but illustrating the location of the attenuator on completion of a machining or resurfacing task by the cutter bits;

FIG. 7 is a view taken along the line 7—7 of FIG. 5;

FIG. 8 is a view taken along the line 8—8 of FIG. 5;

FIG. 9 is a perspective view of the pair of the attenuator of FIG. 1; and

FIG. 10 is a view similar to FIG. 9, but illustrating the pads rotated through 180 degrees to present fresh wearing faces.

DESCRIPTION OF THE PREFERRED EMBODIMENT

Figure 1:
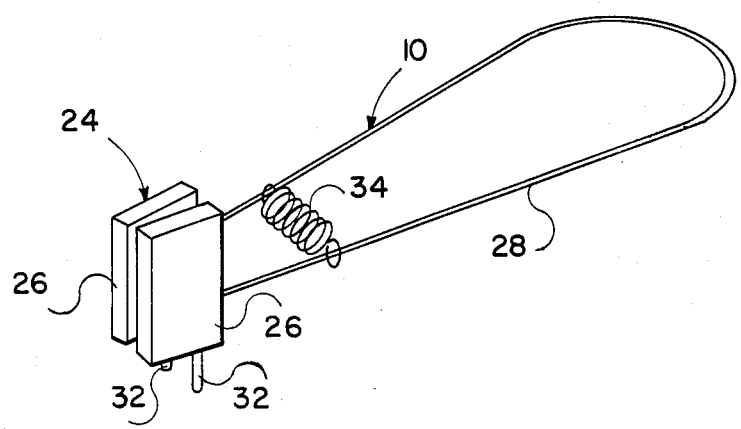
FIG. 1 is a perspective view of the present vibration attenuator.

The present vibration attenuator, generally designated by the numeral 10, is illustrated in FIG. 4 in association with a typical brake rotor lathe which includes a usual lathe arbor assembly 12 and a cutter mounting carriage 14. The construction and operation of the rotor lathe will not be described in detail inasmuch as such details are well-known to those skilled in the art. Moreover, the lathe illustrated is merely exemplary. The attenuator 10 need not be associated with the particular lathe illustrated, but is adapted for operation with any lathe capable of rotor machining operations. The disc brake rotor 16 to be machined is fixed within the arbor assembly 12 for rotation by the lathe. The lathe carriage 14 mounts a pair of tool holders 20, only one of which is illustrated, which carry a pair of cutting bits 18. Movement of the carriage 14 moves the cutter bits 18 across the opposite faces of the rotor 16 to machine or resurface the opposite rotor faces and render them parallel and flat or planar.

Adjustment knobs 22 on the carriage 14 are rotatable to vary the depth of cut of the bits 18, as will be apparent to those skilled in the art.

As previously indicated, machining of the rotor 16 by the cutter bits 18 often produces very loud, harsh vibrations which are accompanied by vibration or chatter of the bits 18 such that accurate machining of the rotor faces is adversely affected.

Figure 2:
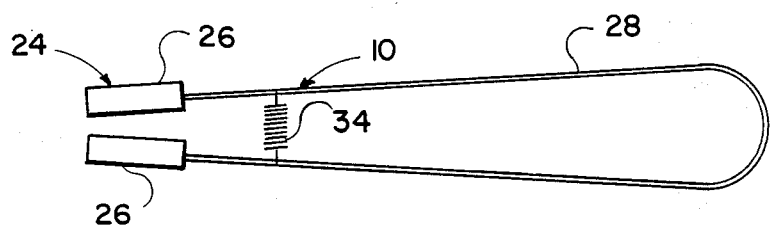
FIG. 2 is a top plan view of the attenuator of FIG. 1.
Figure 3:
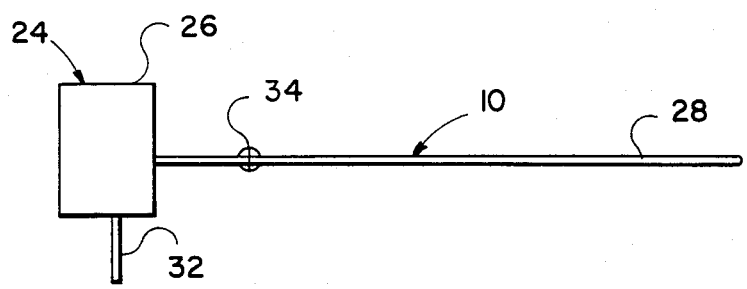
FIG. 3 is a side elevational view of the attenuator of FIG. 1.

As best seen in FIGS. 1–3, the attenuator 10 comprises, generally, a pad assembly 24 which includes a pair of pads 26 made of suitable friction resistant material, such as the type of material used in automobile clutch linings. The pads are generally rectangular, measuring 1¾" by 1¼" by ⅜" thick. The pad assembly 24 also includes a U-shaped rod or handle 28 having a radius of approximately 2" at the bend area, the total length of the rod being approximately 18", with a ⅛" thick diameter.

The handle 28 is dipped in a resilient liquid material, such as rubber or a suitable resilient plastic material, to provide a coating, indicated generally at 30 in FIGS. 5 and 6. The purpose of the coating 30 will be described subsequently.

The extremities of the legs of the U-shaped handle 28 are press fitted within complemental openings drilled or otherwise formed in the pads 26. In addition, a pair of elements or pins 32 are press fitted within complemental openings provided in the underside of the pads 26, the pins 32 thereby projecting downwardly for a purpose which will be described. The pins 32 preferably extend in their seating openings into contact with the legs of the handle 28. With this arrangement the pins 32 can be driven against the handle legs with a hammer to slightly indent the material of the handle legs and thereby constrain the pads against pivotal movement relative to the handle legs. However, as will be seen, the pads can be forcibly pivoted to reposition them to present fresh wearing faces.

As seen in FIGS. 4–8, the handle 28 is normally positioned to rest upon the top of the carriage 14 with the pads 26 in frictional engagement with the opposite faces of the rotor 16, and in superjacent relation to the cutter bits 18. A bias means in the form of a tension spring 34 is disposed between the opposite legs of the handle 28. Loops (not shown) of the spring 34 are disposed about the handle legs and bear upon the coating 30. The coating presents a frictional constraint against inadvertent movement of the spring 34 along the length of the handle legs, preventing displacement of the spring 34 from the position in which it has been placed to develop an optimum spring force. The spring 34 can be deliberately moved by relieving the pull on the handle leg and moving it along the length of the handle leg, as desired. Springs of various spring rates can be selected, as required to provide optimum vibration damping for the particular type and size of rotor 16 and cutter bits.

In FIG. 4 the rotation of the rotor 16 is seen to be clockwise, forcibly urging the pads 26 downwardly against the upper surfaces of the cutter bits 18. In addition, as the carriage 14 moves the cutter bits 18 radially outwardly in a cutting direction, the pads 26 are carried along with the cutter bits 18. This is accomplished by location of the pad pins 32 on that side of the cutte bits facing in the cutting direction.

With the foregoing arrangement the pads 26 are always in biased contact with the cutter bits 18 and the adjacent faces of the rotor 16 during the cutting operation. This is in contrast to attenuators of the prior art which do not include any arrangement similar to the pins 32, whereby such prior art attenuators at best only damp vibrations of the rotor and have no corresponding affect on the cutter bits as such.

As seen in FIGS. 9 and 10, once the inner faces of the pads 26 are worn down to the point where the legs of the handle 28 are in danger of being exposed, the pads 26 are pivoted 180 degrees to the positions illustrated in FIG. 10 to bring the unworn pad faces into operative position.

From the foregoing it will be apparent that the present attenuator 10 is, unlike attenuators of the prior art, operative to maintain a close and continuing engagement with the cutter bits 18 to damp unwanted rotor and cutter vibrations at the exact source of such vibrations. This has been found to result in much quieter and more accurate machining of disc brake rotors.

Various modifications and changes may be made with regard to the foregoing detailed description without departing from the spirit of the invention.

I claim:

1. A vibration attenuator for use with a brake lathe having a rotatable disc brake rotor and a tool holder mounting a pair of cutter bits for movement in a predetermined direction to machine opposite faces of the rotor to thereby render the opposite faces planar, said vibration attenuator comprising:

a U-shaped handle having a bend at its mid-portion from which extends a pair of legs;

a pair of pads secured to the face of the free ends of said legs for frictional engagement with the opposite faces of said rotor in superjacent relation to said cutter bits, said pads each being formed with a pin for engagement with said cutter bits upon movement of said cutter bits in said predetermined direction whereby said attenuator may be moved in said predetermined direction by said cutter bits, but with said attenuator being movable independently of the movement of said cutter bits, said pads being selectively pivotable upon said legs to pivot worn faces of said pads out of engagement with said rotor and present the opposite faces of said pads for engagement with said rotor;

a tension spring interposed between the legs of said handle to bias the pads against the opposite faces of said rotor, with said spring being movable relative to said legs to vary the biasing force exerted by said spring; and means on said handle which engage the ends of said spring that provide sufficient frictional restraint to prevent inadvertent displacement of said spring from a selected position.

2. A vibration attenuator as set forth in claim 1 wherein the legs of said handle are provided with a resilient coating and the ends of said spring are formed with loops that engage said coating.

3. A vibration attenuator as set forth in claim 1 wherein said pins extend through said pads into frictional contact with the legs of said handle.

4. A vibration attenuator as set forth in claim 2 wherein said pins extend through said pads into frictional contact with the legs of said handle.

* * * * *